June 10, 1969 C. E. KNOWLES 3,448,926
PORTABLE SPRAYER

Filed March 14, 1967

INVENTOR.
COYLE E. KNOWLES
BY
Bean, Brooks, Buckley & Bean
ATTORNEY

INVENTOR.
COYLE E. KNOWLES

United States Patent Office 3,448,926

Patented June 10, 1969

1

3,448,926
PORTABLE SPRAYER
Coyle E. Knowles, Gowanda, N.Y., assignor to Buffalo Turbine Agricultural Equipment Co., Inc., Gowanda, N.Y.
Filed Mar. 14, 1967, Ser. No. 623,034
Int. Cl. A01n *17/10;* B05b *9/08*
U.S. Cl. 239—77 7 Claims

ABSTRACT OF THE DISCLOSURE

A portable ultra-low volume liquid sprayer including a shell mounted on a base with a motor driven fan at one end of the shell, air straightening vanes in the shell, a liquid dispersing mechanism at the opposite end of the shell including an annular rotatable apertured cage driven by a propeller in the airstream produced by the fan, conduit means extending into the cage from a pressurized liquid tank, and a sealing plate mounted over an open end of the cage to confine all of the liquid deposited in the cage for dispersion into the air stream emanating from said opposite end of the shell.

Figure 1:
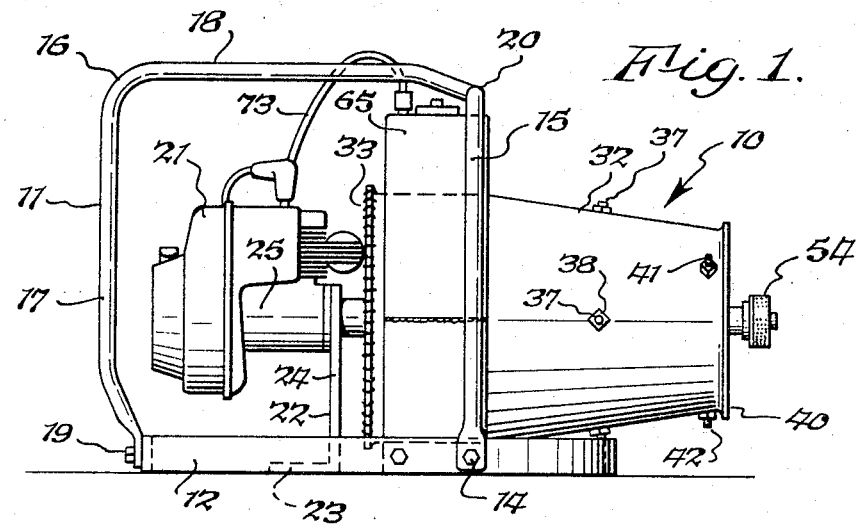

The present invention relates to an improved portable sprayer for dispensing liquid insecticides or fungicides in ultra low volumes, that is, as little as four ounces per acre.

Existing ground-based agricultural sprayers which produce an airstream-borne finely divided spray are incapable of dispensing ultra low volumes of liquid in a uniform manner. In addition, such sprayers are not suitable for use by a small land-owner, that is one owning a few acres or less, because they are too expensive, and too large to be carried and conveniently stored.

It is accordingly a primary object of the present invention to provide an improved ultra low volume liquid sprayer which is capable of dispensing relatively small amounts of finely dispersed liquid in a uniform manner, and which is relatively small, portable, and which can be produced at a relatively low cost, and is therefore manifestly suitable for use by an owner of small amounts of lands.

Another object of the present invention is to provide an improved ultra low volume portable liquid sprayer in which all of the components necessary for spraying, including the liquid to be sprayed, are mounted together as a unit.

A further object of the present invention is to provide an ultra low volume improved portable sprayer in which the sprayer produced airstream in which the dispersed liquid is entrained also serves to drive the dispersing mechanism.

Yet another object of the present invention is to provide an improved ultra low volume portable liquid sprayer in which the feeding of liquid to the dispersing mechanism is assured regardless of the attitude in which the sprayer is held. Other objects and attendant advantages of the present invention will readily be perceived hereafter.

The improved ultra low volume portable liquid sprayer of the present invention includes a frame having a base and handle means mounted on the base. Motor means are mounted on the base for driving a blower consisting of a fan and air straightening vanes mounted proximate the fan. The air straightening vanes are mounted within an elongated tubular shell which produces a columnar airstream which is capable of maintaining its form for a distance of fifty to sixty feet, thus enabling spraying of remote areas such as the tops of trees. A liquid tank is mounted on the frame and an air pump driven by the motor means is in communication with the tank for

2 pressurizing the latter to thereby insure proper feed of liquid from the tank in all reasonable attitudes in which the sprayer is held. A liquid dispersing means is mounted near the outlet end of the tubular shell, remote from the fan means. The dispersing means includes a shaft which is journalled centrally of the tubular shell. A propeller and a rotatable cage are spacedly mounted on the shaft. The columnar airstream passing through the shell drives the propeller and also rotates the apertured cage, thereby driving the liquid dispersing means in addition to carrying dispersed liquid to the target area. The various aspects of the present invention will be more readily understood when the following portions of the specification are read in conjunction with the accompanying drawings wherein:

FIGURE 1 is a side elevational view of the improved portable ultra low volume liquid sprayer of the present invention;

FIGURE 2 is a plan view of the device shown in FIGURE 1;

FIGURE 3 is an end elevational view taken from the right of FIGURE 1;

FIGURE 4 is a fragmentary view, partially in cross section, taken substantially along line 4—4 of FIGURE 2;

FIGURE 5 is a view partially in cross section taken substantially along line 5—5 of FIGURE 3 and showing the manner in which the liquid dispersing means is mounted and the manner in which liquid is fed thereto; and FIGURE 6 is a view taken substantially along line 6—6 of FIGURE 5 and further showing the manner in which dispersing means is mounted.

The improved ultra low volume liquid sprayer 10 of the present invention includes a frame 11 having a generally ovel-like base 12 to which an inverted U-shaped yoke 13 is secured by bolts 14 attached to the lowermost portions of legs 15 of inverted U-shaped member 13. An inverted L-shaped handle 16 having a vertical leg 17 and a horizontal leg 18 is provided. The lowermost portion of vertical leg 17 is attached to the end of base 12 by bolt 19 and the end portion of horizontal leg 18 is secured centrally of horizontal portion 20 of U-shaped member 11 by welding. Horizontal portion 18 can be grasped by an operator for carrying portable sprayer 10, and for manipulating the sprayer during use.

A gasoline engine 21, which may be of the two-cycle type manufactured by the L. M. Cox Manufacturing Company of Santa Anna, Calif., is mounted on angle bracket 22 having a horizontal base 23 and a vertical wall 24. The opposite ends of base 23 are welded or otherwise suitably secured to the substantially parallel sides of base 12. Engine 21 includes a tank for carrying gasoline. Housing portion 25 of engine 21 abuts vertical plate 24 and is secured thereto by means of bushing 26 through which shaft 27' extends.

Engine 21 drives a blower arrangement which provides a column of air. More specifically, a fan 27 is secured to shaft 27' by set screw 29 on hub 28. A cup-shaped portion 30 extends from hub 28 and mounts a plurality of spaced fan vanes 31. The fan may be a die-casting. It is to be noted that fan 27 is relatively heavy compared to the weight of engine 21 and the mass of this fan equalizes the two-cycle engine and thus gives its momentum to prevent pulsations which in turn keeps the entire unit tight against vibration and also makes it easier for the operator to handle the sprayer in use.

At this point it is to be noted that an elongated generally cylindrical tubular shell 32 is mounted on base 12 by means of legs or struts 32' extending from shell 32 and secured to said base by bolts 14. The end of tubular shell 32 proximate engine 21 includes a screen 33 which prevents entrance of undesired foreign objects into the chamber in which fan 27 is located. The screen is bent over peripheral annular lip 34 at one end of shell 32. A plurality of straightening vanes 35 are peripherally mounted on cup-shaped member 36 which has an open end facing the open end of cup-shaped fan 27. Member 36 is mounted within shell 32 by stems 37 which extend outwardly therefrom and are secured to shell 32 by means of nuts 38 cooperating with threaded portions on said stems. The vanes 35 straighten the airstream which is produced by the rotation of fan 27, said airstream passing between the outer surface of cup-shaped member 36 and the inner surface 39 of shell 32. The vanes 35 control turbulence by stabilizing the airstream. It is to be noted that shell 32 decreases in cross sectional area toward the outlet portion 40 and this is essentially a Venturi shape which gives a more concentrated column and increased velocity at the exit. The airstream which is thus produced and straightened leaves shell 32 at outlet end 40.

Mounted proximate outlet end 40 is a liquid dispersing arrangement. This mounting is effected by a plurality of stems 41, 42 and 43 which have their outer ends attached to shell 32 proximate end 40 by suitable threaded connections. For example, nuts 44 and 45 fit on the threaded end 46 of stem 42 with nut 44 being located on the inside of shell 32 and nut 45 being located on the outside thereof. Similar connections, not shown, are provided for each of the other stems 41 and 43. The inner end of stem 42 has a portion 47 which threads into body portion 48. The inner end of stem 41 has a threaded portion 49 which is threaded into body portion 48, and the inner end of stem 43 has a threaded portion 50 which is received in body portion 48. Body portion 48 is thus held centrally within the outlet 40 of shell 32 and serves as a bering for shaft 51 which mounts propeller 52 at one end by means of set screw 53 and mounts annular dispersing cage 54 on the other end by means of set screw 55. Annular cage 54 includes a plurality of spaced apertures in peripheral wall 56'. A sealing plate 57 is mounted on body portion 48 by means of set screw 59 to provent liquid from passing out of open end 59'.

The airstream which is produced in the above described manner drives propeller 52 and thus rotates shaft 51, and with it apertured cage 54. The liquid to be sprayed is fed against inside 62 of wall 60 of cage 54 from conduit 61 in housing 48. The rapid rotation of cage 54 causes the liquid to travel outwardly on the inside 62 of wall 60 toward apertures 56. The rapid rotation of the cage will cause the liquid passing through apertures 56 to be dispersed into extremely fine droplets of the size of between 80 and 100 microns. The liquid thus dispersed is entrained in the airstream emanating from outlet 40 and is carried therewith to the target area which may be plants, trees or the like. At this point it is to be noted that the column of air emanating from outlet 40 will remain as a distinct entity for a distance of between 50 and 60 feet, thereby permitting the liquid to be applied to the tops of tall trees.

If for any reason it is desired to change the speed of rotation of cage 54, it is merely necessary to change the pitch of propeller 52 by bending it with the fingers. This can be done simply because of the flexible nature of the propeller.

Figure 2:
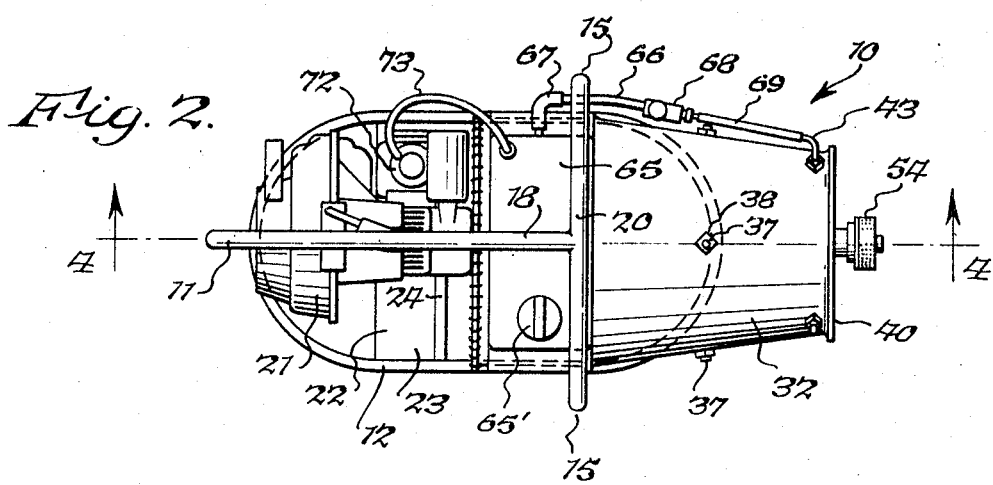
Figure 3:
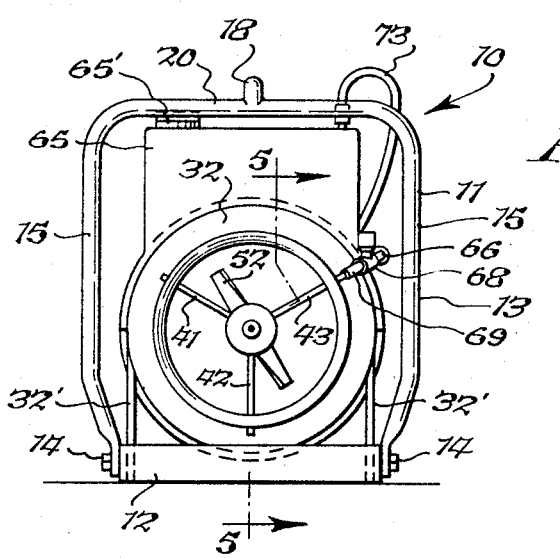
Figure 4:
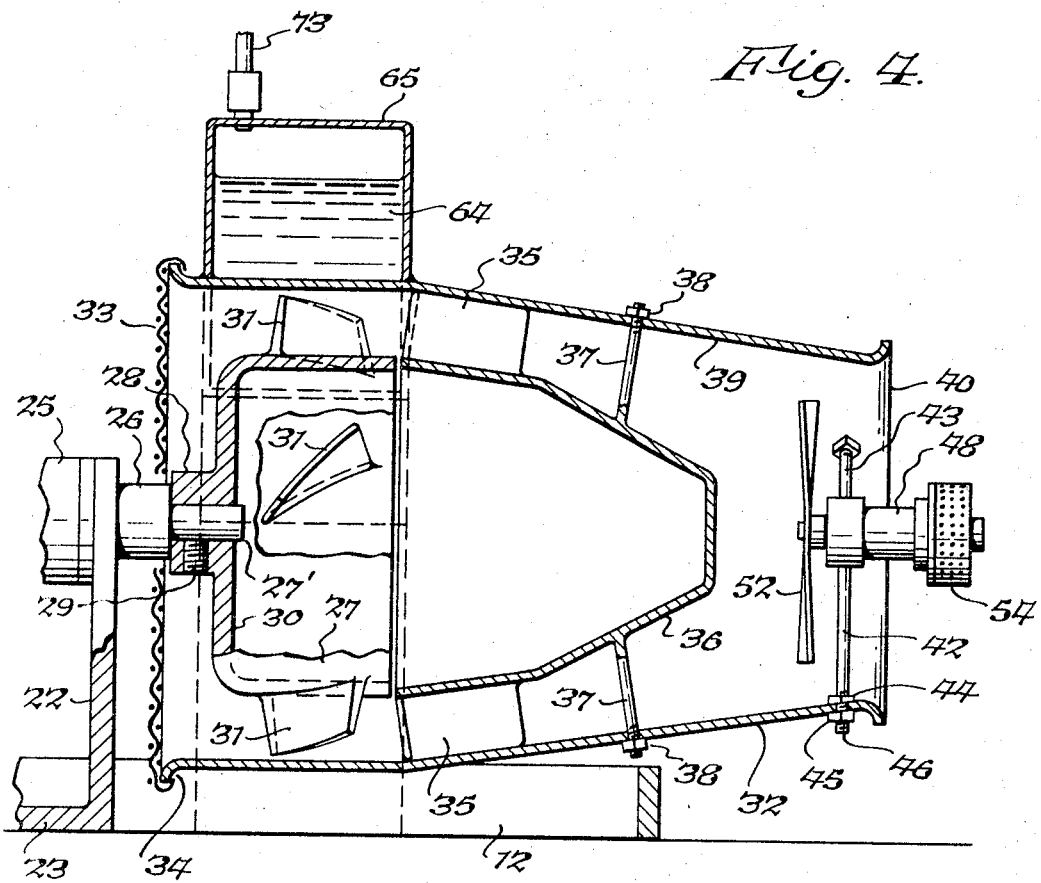
Figure 5:
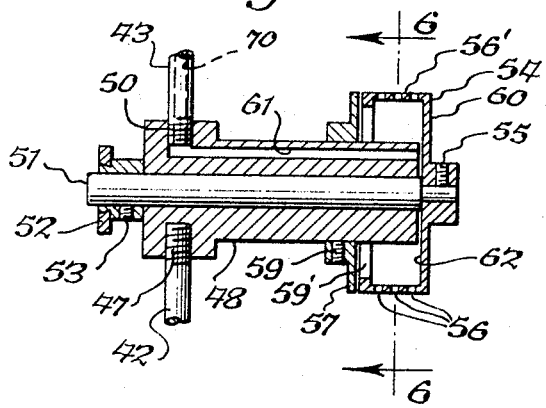
Figure 6:
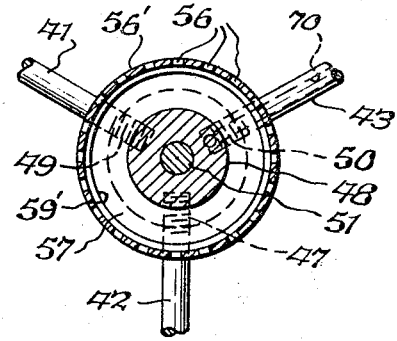

The liquid to be sprayed 64 is contained within tank 65 mounted on the top of shell 32. A conduit 66 is connected to tank 65 through elbow 67. A vernier valve 68 is in communication with conduit 66 for metering the flow passing to conduit 69. The vernier valve may be of the type manufactured by Alkon Products of Wayne, N.J., and identified by Model J.N. 1 in catalog 14–2. By properly setting the vernier valve 68 proper flow can be assured. Conduit 69 is mounted on the end of stem 43, FIG. 2. As can be seen from FIGURES 5 and 6, stem 43 has a bore 70 therein so that it can convey liquid to bore 61 in housing 48 from which it is deposited within cage 54. It is in this manner that the liquid from tank 65 is conveyed to cage 54 for dispersion into the airstream which ultimately deposits it on the target area.

During operation it is quite apparent that the attitude of sprayer 10 will be constantly changed as the airstream produced thereby is directed at different targets. It is important that constant feed be assured, and to this end a pressure feed arrangement is provided. The pressure feed arrangement consists of a pneumatic pump 72, FIG. 2, mounted on engine 21 and driven by a rotating portion thereof. This pump is a diaphragm pump having an inlet check valve and an outlet check valve, as is well understood in the art. The inlet check valve permits the air to enter the pump chamber and closes when the pump moves this air from the pump chamber into conduit 73 leading to tank 75. The second check valve associated with conduit 73 prevents the pressure built up in tank 65 from being dissipated. It is this positive pressure which insures a constant feed of liquid to the dispersing cage 54 through the above described path. Liquid can be supplied to tank 65 through the opening covered by cap 65'.

The entire sprayer weighs approximately ten pounds and is approximately a foot long and five inches wide and ten inches high. Cage 54 is approximately 1½ inches in diameter and apertures 56 are .052" in diameter spaced on ⅛" centers. A total of sixty apertures 56 are provided in wall 56; with the apertures being positioned in twenty circumferentially spaced rows of three apertures each.

From the foregoing description it can be seen that the improved ultra low volume liquid sprayer of the present invention is manifestly capable of achieving the above enumerated objects and while a preferred embodiment of the present invention has been disclosed, it is to be understood that it is not limited thereto but may be otherwise embodied within the scope of the following claims.

I claim:

1. A portable ultra-low volume liquid sprayer comprising a frame, motor means mounted on said frame, an elongated shell mounted on said frame for conducting air and having first and second ends, blower means coupled to said motor means and driven thereby, said blower means being mounted proximate said first end of said shell for providing air to said shell, air straightening vanes mounted within said shell proximate said blower means for directing air from said blower means in an axial path through said shell toward said second end thereof, a rotatable apertured cage for dispersing liquid including a perforated annular wall and an end wall, a shaft secured to said rotatable cage, support means including a bearing for said shaft for mounting said apertured cage proximate said second end of said shell, means secured to said shaft for driving said rotatable cage, a liquid tank mounted relative to said frame, means for pressurizing liquid in said tank to insure feeding of liquid from said tank in all attitudes of said sprayer, conduit means having a first end in communication with said tank and a second end extending into said cage, and means for confining all of the liquid emanating from said conduit means to a location within said cage to insure dispersion by said cage of all liquid emanating from said conduit means into the air stream leaving said second end of said shell.

2. A portable ultra-low volume liquid sprayer as set forth in claim 1 wherein said means for confining said liquid within said cage comprises a sealing plate mounted in opposition to said end wall.

3. A portable ultra-low volume liquid sprayer as set forth in claim 2 wherein said second end of said conduit means terminates in contiguous relationship to said end wall of said cage so that said liquid emanating therefrom is deposited on said end wall and carried by the centrifugal force of rotation of said cage to said annular wall.

4. A portable ultra-low volume liquid sprayer as set forth in claim 3 wherein said second end of said conduit means comprises a bore in said bearing and wherein said sealing plate is mounted on said bearing.

5. A portable ultra-low volume liquid sprayer as set forth in claim 4 wherein said support means comprises a plurality of radial supports extending inwardly from said second end of said shell for supporting said bearing means, and wherein said conduit means includes a portion between said first and second ends thereof located within at least one of said radial supports.

6. A portable ultra-low volume liquid sprayer as set forth in claim 5 wherein said radial supports comprise thin stem-like members having first ends secured to said shell and seconds ends threaded into said bearing means.

7. A portable ultra-low volume liquid sprayer as set forth in claim 6 wherein said frame comprises a base and handle means comprising an inverted U-shaped yoke extending over said shell and having opposite legs attached to said base.

References Cited

UNITED STATES PATENTS

| | | | |
|---|---|---|---|
| 2,738,226 | 3/1956 | Bals | 239—77 |
| 3,221,993 | 12/1965 | Bals | 239—77 |

EVERETTE W. KIRBY, *Primary Examiner.*

U.S. Cl. X.R.

239—152